T. EDWARDS.
PROCESS OF PREPARING FOOD PRODUCTS.
APPLICATION FILED OCT. 13, 1910.
1,001,375.
Patented Aug. 22, 1911.
2 SHEETS—SHEET 1.
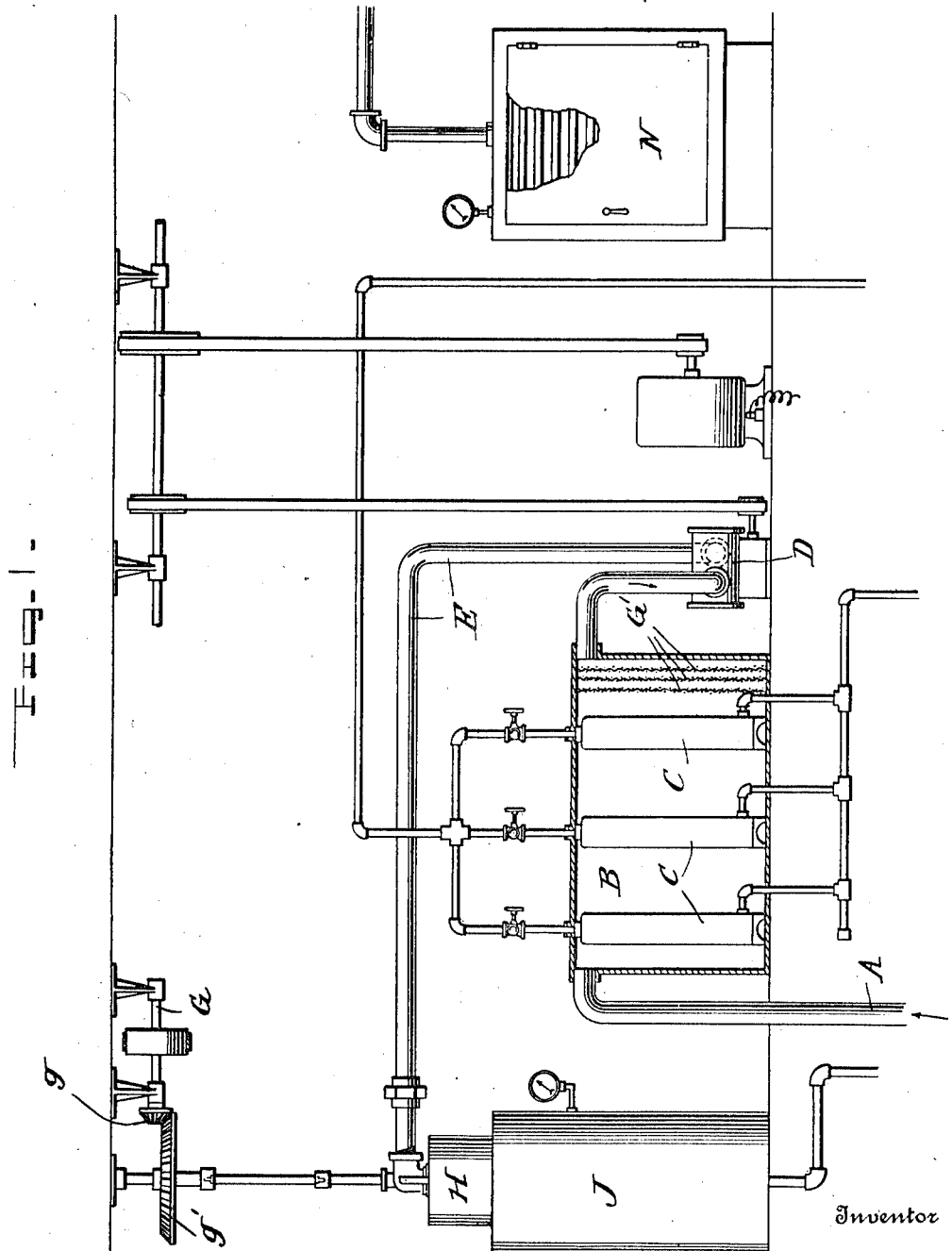

T. EDWARDS.
PROCESS OF PREPARING FOOD PRODUCTS.
APPLICATION FILED OCT. 13, 1910.
1,001,375.
Patented Aug. 22, 1911.
2 SHEETS—SHEET 2.
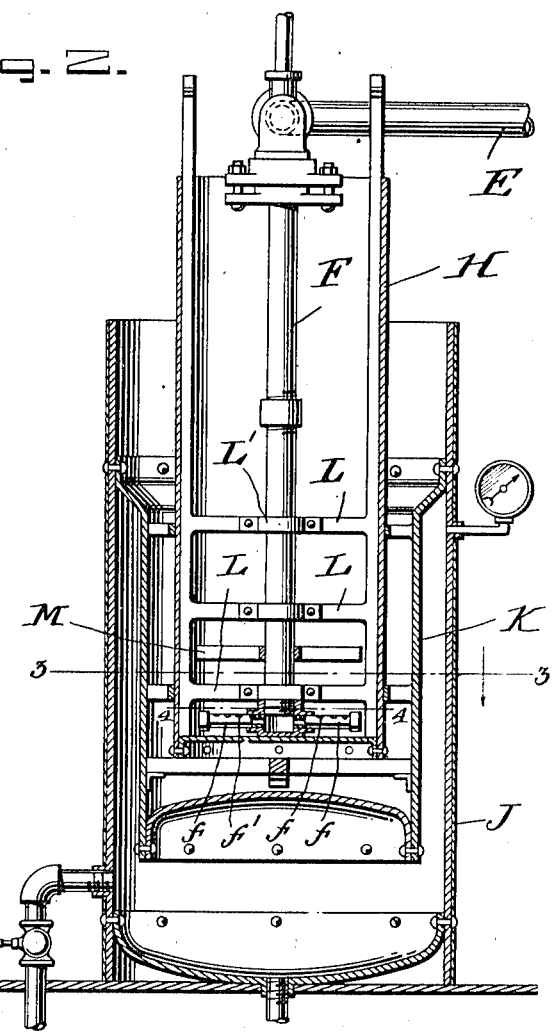
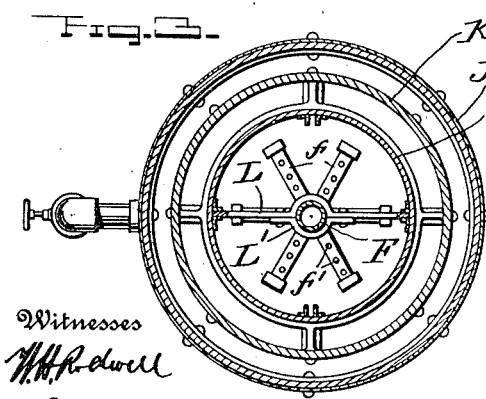
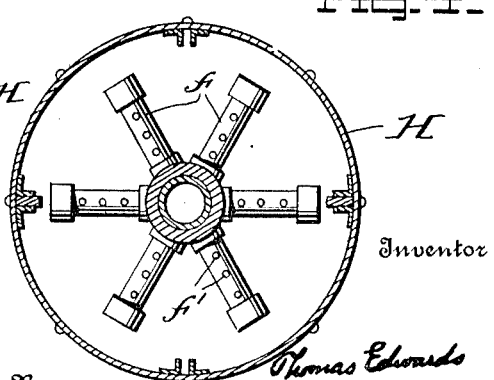

UNITED STATES PATENT OFFICE.

THOMAS EDWARDS, OF WASHINGTON, DISTRICT OF COLUMBIA.

PROCESS OF PREPARING FOOD PRODUCTS.

1,001,375.     Specification of Letters Patent.     Patented Aug. 22, 1911.

Application filed October 13, 1910. Serial No. 586,880.

*To all whom it may concern:*

Be it known that I, THOMAS EDWARDS, a citizen of the United States, residing at Washington, District of Columbia, have invented certain new and useful Improvements in Processes of Preparing Food Products, of which the following is a full, clear, and exact specification.

This invention relates to improvements in the process of treating food products such as oysters, clams and other similar shell fish, whereby the same may be preserved for an indefinite period of time and the natural flavor and all nutritious properties of the food so treated retained in every respect.

The object of the invention is to prepare an article of food of this character wherein the completed product is reduced to the form of a powder, which will remain fresh and retain all the natural and nutritious properties of the oysters or clams for an indefinite period of time, in such shape as to be readily bottled or packaged for shipment.

In the accompanying drawings I have shown one method of carrying out my process although it is evident that other apparatus may be devised for such purpose.

In said drawings:—Figure 1 illustrates diagrammatically an apparatus suitable for this purpose, Fig. 2 is a sectional view of the receptacle for containing the material being treated; Fig. 3 is a sectional view on the line 3—3 of Fig. 2; and Fig. 4 is a sectional view on the line 4—4 of Fig. 2.

In said drawings A indicates an air inlet pipe, which conveys air to the receptacle B, wherein the air is heated by means of radiators C or any other preferred form of heating arrangement.

D indicates a suction and forcing apparatus which draws the air from the outside through the heating receptacle B and at the same time forces the heated air through the pipe E which communicates with the down pipe F leading into the receptacle containing the food under treatment.

For purpose of purifying the air drawn in through pipe A a series of screens G' are arranged in the end of the heating receptacle B through which the air must pass before reaching the material being treated.

The suction and forcing apparatus D is operated through any suitable belt and pulley connections. Mounted on the shaft G is a gear wheel $g$ in mesh with the gear wheel $g'$ by which the down pipe F is continuously revolved while the air is being forced through pipe F. At the lower end of pipe F radially extending arms F are provided, said arms having a series of perforations $f'$, through which the air escapes into the mass under treatment and out through the upper open end of the receptacle H.

J indicates a receptacle for the reception of hot water or steam for the purpose of heating the water placed in the inner receptacle K. The material receiving receptacle H is mounted in receptacle K and the material contained therein is heated by means of the hot water or steam contained in receptacle K, at the same time that currents of air, preferably hot air, are being forced through said material under treatment.

For the purpose of thoroughly breaking up and separating the constituent elements of the mass under treatment, I provide a series of cross arms L which are mounted in the material receiving receptacle H. These cross arms L are stationary or fixed and are formed with bearing L' in which the down pipe F freely rotates. For the purpose of aiding in the breaking up of the constituent parts of the mass in receptacle H, I provide the cross arm M rigidly connected to the down pipe F and hence revoluble therewith.

N indicates an evaporator in which the mass is placed for purpose of removing any remaining moisture after treatment in the above described apparatus.

The process of treating the food consists first in placing the oysters or clams either in their natural state or in a cooked condition into a grinder of any desired kind and grinding the same. This mixture thus ground is then placed in any desired receptacle and the receptacle is placed in a bath of hot water or subjected to heat in any desired manner. At the same time that the mass is subjected to this heat numerous air currents, preferably of hot air, are forced through the mass thus confined in the receptacle, the mass at the same time being caused to be constantly broken up into small particles whereby the moisture is more readily removed therefrom. The forcing of air currents through the mass is continued for a period of time sufficient to practically remove all the moisture therefrom or until the mass is reduced to a mushy consistency. The material thus being treated is then removed from this receptacle and placed in an evaporating apparatus for the purpose of removing any remaining moisture therefrom. After such remaining moisture is removed the mass is pulverized in any desired manner and the resulting product is then bottled or packaged and is ready for the market.

If desired, during the above mentioned treatment of the oysters or clams, a small amount of salt might be added thereto. It is to be understood, however, that the addition of salt is not necessary for the purpose of the present invention.

Having thus fully described my invention what I claim as new and desire to secure by Letters Patent is:—

1. A process for preparing oysters, clams or similar shell fish which consists in grinding them and placing the same in a heated receptacle, then agitating the mass to break it up into small particles and at the same time forcing heated air under pressure therethrough to expel the moisture therefrom and reduce the mass to a mushy consistency, then subjecting to an evaporating operation and finally pulverizing the mass.

2. A process for preparing oysters, clams or similar shell fish which consists in subjecting them to a grinding operation, agitating the mass to break the same into small particles and simultaneously expelling the moisture therefrom and reducing the same to a mushy consistency, then subjecting the mass to an evaporating operation and finally pulverizing the mass.

In testimony whereof I have signed my name to this specification in the presence of two subscribing witnesses.

THOMAS EDWARDS.

Witnesses:
  E. L. WILLIAMS,
  CHAS. E. RIORDON.